April 5, 1932. C. J. DUNZWEILER 1,852,558
STORAGE BATTERY
Filed Oct. 11, 1929
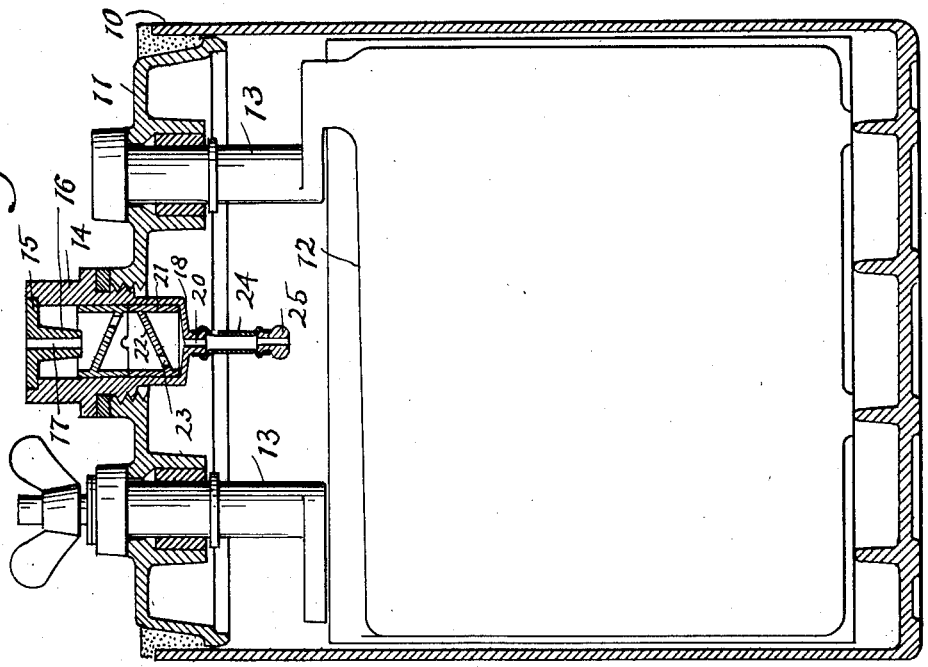
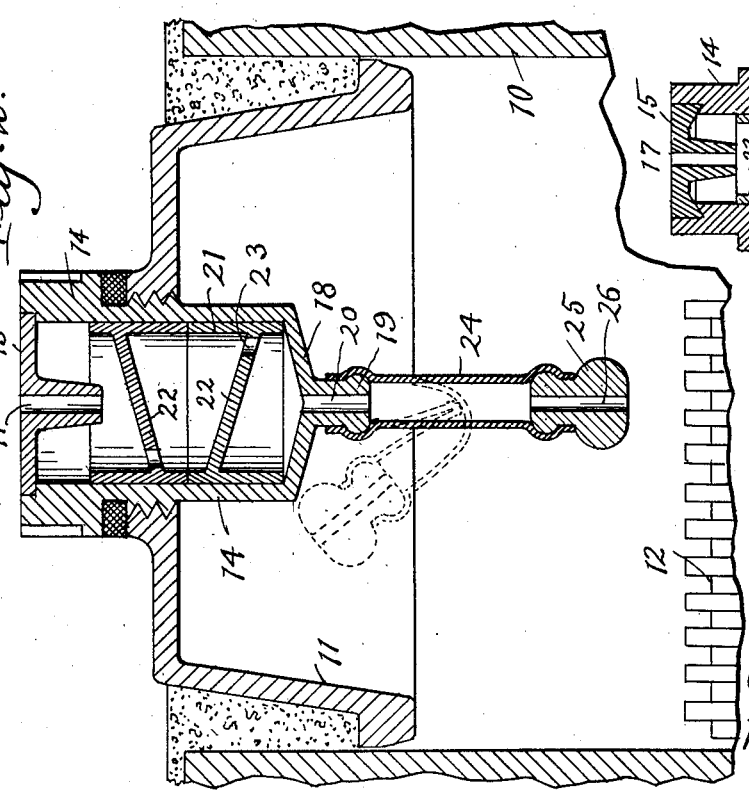
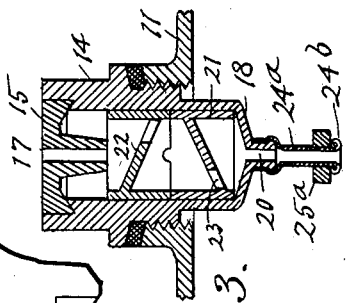
Inventor
Carl J. Dunzweiler
Kwis Hudson & Kent
attys.

Patented Apr. 5, 1932

1,852,558

UNITED STATES PATENT OFFICE

CARL J. DUNZWEILER, OF CLEVELAND, OHIO, ASSIGNOR TO WILLARD STORAGE BATTERY COMPANY, OF CLEVELAND, OHIO, A CORPORATION OF WEST VIRGINIA

STORAGE BATTERY

Application filed October 11, 1929. Serial No. 399,053.

This invention relates to storage batteries, and has particular reference to the venting of the battery. The invention has a special utility on batteries, such as airplane batteries, which are at times inverted.

A principal object of the invention is to provide improved means for preventing the leakage or spillage of electrolyte through the vent plug when the battery is inverted or substantially inverted.

It has been proposed heretofore to provide valves in the vent plugs to prevent the discharge of electrolyte through the vent plug when the battery is inverted, but these valves, which involve a movable valve member and a seat, are not reliable, their operation being rendered uncertain because of corrosion and for other reasons.

Airplane batteries in use at the present time have a non-spill feature accomplished by providing a large acid space between the top of the plates and the cell cover and by providing a long tubular extension on the lower part of the vent plug so that when the battery is inverted the lower end of this extension is above the level of the electrolyte when occupying the acid space of the inverted battery.

By the present invention I provide a simple and reliable means for preventing the escape of electrolyte from the battery when it is inverted and at the same time am able to reduce the space between the plates and the cell cover.

The invention may be briefly summarized as consisting in certain novel details of construction and combinations and arrangements of parts which will be described in the specification and set forth in the appended claims.

In the accompanying sheet of drawings illustrating the invention—

Fig. 1 is a vertical sectional view taken lengthwise of a cell of the battery;

Fig. 2 is a fragmentary transverse sectional view on an enlarged scale; and

Fig. 3 is a detail sectional view through the vent plug and the adjacent portion of the cover showing a slight modification.

The battery may have any number of cells which may be arranged in compartments of a multicompartment or monobloc container or in separate jars adapted to be mounted in a case. One cell only is herein illustrated but it is to be understood that the construction will be the same for each of the cells. A portion of the battery herein illustrated includes a container 10 with a cell cover 11, one of which will be provided for each cell. If the container 10 is of the multicompartment type the cell compartments will be separated by integrally formed partitions constructed in the well known manner. Each cell of the battery has positive and negative plates of a battery element, designated as a whole by the reference character 12, with positive and negative posts 13, 13 which extend up through and are suitably sealed in the cover 11.

Between the posts 13, 13 is a vent plug embodying my invention. This vent plug includes a vent plug body 14, usually formed of rubber and adapted to be screwed into a flanged opening formed in the cover. The vent plug is in this instance closed at the top by a disk 15 with a downward extension 16 having a vent opening 17. The bottom 18 of the vent plug has a depending tubular extension 19 with an opening 20 extending therethrough. I prefer that the space between the top and bottom of the vent plug be provided with condensing chambers and this is accomplished, in this instance, by mounting in the vent plug sleeves 21 having superimposed inclined walls 22 forming baffles which are inclined oppositely with respect to each other, each being provided in its lower portion with an outlet opening 23. While I do not regard these baffles as an essential feature of the invention or as necessary to its proper functioning, they are useful in bringing about the condensation or collecting of small particles of electrolyte carried upward with the escaping gas and they also assist in preventing the escape of electrolyte when the battery is turned to or toward inverted position.

A chief feature of the invention resides in the attachment to the bottom of the vent plug of a flexible tube 24 which constitutes a gas inlet leading to the vent plug and is capable of kinking when the battery is turned over. In this instance the tube is slipped over and thus attached to the extension 19 at the lower end of the vent plug but it may be otherwise attached. This tube is preferably formed of relatively soft or flexible rubber which will allow its ends to be expanded or stretched in applying it. At the lower end of the tube I prefer to provide a weight 25, somewhat akin to a pendulum weight, which weight has an opening 26 extending therethrough. In Figs. 1 and 2 the lower end of the flexible tube 24 is slipped over an enlargement on a neck portion of the weight but this mode of attaching the weight to the tube is not essential.

When the battery is in upright position the gas escaping from the battery passes up through the weight and through the tube and into the vent plug and finally out at the top. When the battery is inverted gravity acting on the weight 25 causes the tube to be kinked or doubled upon itself, substantially as shown by dotted lines in Fig. 2, thus effectively closing the tube 24 and preventing the loss of electrolyte. Any electrolyte in the tube before the top is kinked or entirely closed will be prevented from escaping from the vent plug by the baffles and by the top member 15 with its tubular extension 16.

In Fig. 3 I have shown another way of mounting the weight on the lower end of the tube 24a, the weight which is designated 25a being in this instance in the form of a washer which is slipped onto the tube and is supported by a bead 24b rolled onto the lower end of the tube. This tube and its pendulum weight will, of course, function like that shown in Figs. 1 and 2.

Thus, by this simple expedient of a flexible tube weighted at its lower end so that it will be closed by the kinking of the tube, when the battery is inverted, I am enabled to successfully prevent the leakage of electrolyte and avoid the use of the large acid space heretofore employed. By the use of a good grade of rubber the tube will last and be reliable in its action for a long period of time. However, whenever desired, a tube can be very readily replaced with a new tube, by unscrewing the vent plug from the battery and lifting it out of the cell cover. It is to be understood, of course, that the weight will be formed of non-corrodible metal, such as lead.

While I have shown the preferred way of carrying out the invention, I do not desire to be confined to the precise details but aim in my claims to cover all modifications which do not involve a departure from the spirit and scope of the invention.

Having thus described my invention, what I claim is:

1. A battery having a cover with a vent plug provided at its lower end with a flexible tube capable of kinking, and means for kinking and closing said tube upon the inversion of the battery.

2. A battery having a cover with a vent plug provided with a depending weighted flexible tube.

3. A battery having a cover with a vent plug formed with one or more baffles and chambers therein and provided at the bottom with a flexible tube capable of kinking when the battery is inverted and provided with a weight at the end thereof.

4. A battery having a cover with a vent opening therein, a flexible tube communicating with said opening, and means for kinking and closing said tube upon the inversion of the battery.

In testimony whereof, I hereunto affix my signature.

CARL J. DUNZWEILER.